F. B. HUBBARD.
CYLINDER LUBRICATOR.
APPLICATION FILED JUNE 21, 1909.
948,882.
Patented Feb. 8, 1910.
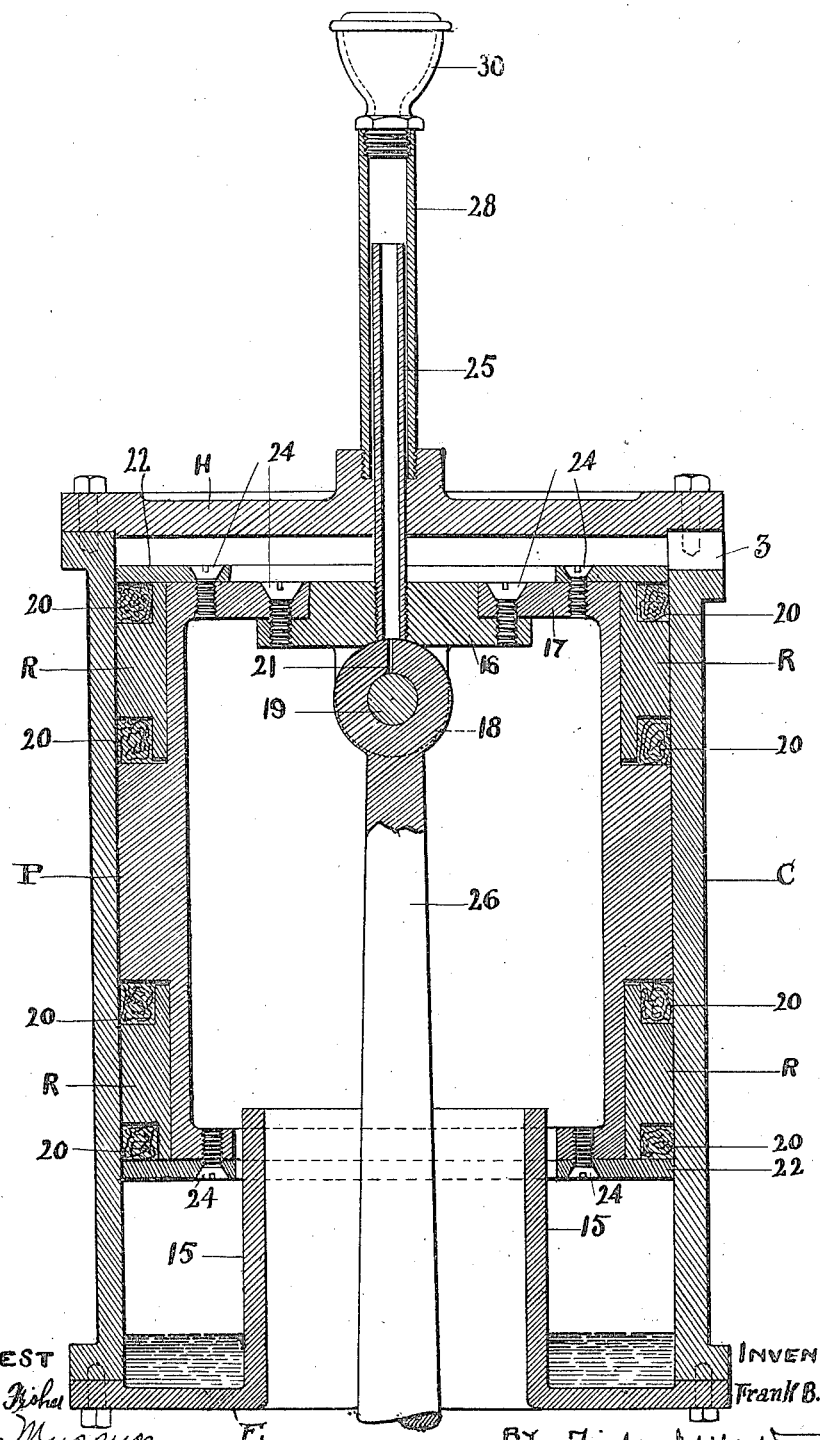

ated Feb. 8, 1910.
UNITED STATES PATENT OFFICE.

FRANK B. HUBBARD, OF MIDDLEFIELD, OHIO.

CYLINDER-LUBRICATOR.

948,882. Specification of Letters Patent. Patented Feb. 8, 1910.

Application filed June 21, 1909. Serial No. 503,374.

*To all whom it may concern:*

Be it known that I, FRANK B. HUBBARD, a citizen of the United States, residing at Middlefield, in the county of Geauga and State of Ohio, have invented certain new and useful Improvements in Cylinder-Lubricators, of which the following is a specification.

My invention relates to improvements in cylinder lubricators, and the invention is shown in this instance in a single sectional elevation of a combined piston and cylinder and associated parts, as hereinafter fully described and particularly pointed out in the claims.

C represents the cylinder of the engine and P is what is known in this particular engine as the power piston, and in the operation the heated air enters the cylinder C through an opening 3 in the top and side thereof, a suitable pipe connection being provided for said opening but not necessarily shown herein. Said piston is preferably made of suitable casting and also preferably with a head having a central opening covered from the inside by a cap 16 secured thereon by screws, and the said cap has a rounded hub 18 on its bottom providing a bearing for the wrist pin 19 which carries the piston rod or pitman 26. At its opposite or lower end said cylinder is provided with a bottom E bolted about its edge to the end of the cylinder and provided with an opening through its center about which there is a tubular extension 15 approximately one-third the entire interior depth of the cylinder and of a width sufficient to give the piston rod 26 all the throw it requires to operate the piston, assuming that the said rod has the usual crank or eccentric connection at its other end. The said bottom E is shown in this instance as being affixed by bolts directly to the edge of the cylinder C, but it might be differently constructed and make a different conection with said cylinder and serve the same purpose, the only necessity being that the connection should be a close one so that it will be fluid tight in its joint with the cylinder. This construction affords an annular space between the tubular extension 15 and the wall of the cylinder into which the piston is adapted to dip or run approximately to the bottom thereof and has movement in the cylinder corresponding substantially to the depth of said tube 15. It follows therefore that the lower end of the piston does not at any time pass above the upper edge of the said tube 15, so that no oil is carried outside the said tube by the piston.

Piston P is further provided with separate and sufficient packing rings R about both end portions, said rings being alike in all cases and recessed at their respective edges to receive felt or equivalent packing 20, thus making the piston perfectly fluid tight about its side next to the cylinder and at the same time giving it the requisite freedom of action in the cylinder. To this end, also, suitable circular rings or follower plates 22 are provided to confine said packing rings and packing, and these are secured to the ends of the piston by means of screws 24.

In engines of this kind, it is of importance that all the parts be well lubricated, and in order to effect such lubrication and make it automatic, I equip the head of the piston with a tube 25 which is screwed into said head and extends down through the same to the bearing inside thereof at which point it intersects with a small duct or channel 21 in said hub or bearing to conduct oil to the wrist pin 19 and keep the same thoroughly lubricated at all times. The said tube 25 is removably fixed into said head and reciprocates with the same through the head of the cylinder, and in order to supply oil to said tube, I affix a tubular casing 28 to the cylinder head H about the tube 25 and which extends above the said tube 25 some distance and is adapted to receive oil from the oil receptacle 30 mounted upon the top thereof. The said receptacle or cup receives the supply of oil, and lubrication proceeds therefrom and from or through the tube casing 28 in such measure as the wrist pin and bearing therefor may require, and any surplus oil is naturally thrown against the inner wall of the piston and runs down the same within the tube 15 at the base into the annular space into which it receives lubrication as against the wall of the cylinder. Thus by means of first oiling the wrist pin and piston bearing thereon from the outside I effect the oiling of the entire engine in all its parts.

What I claim is:

1. The combination of the cylinder having one closed and one open end and a tubular projection on said cylinder entering said open end from beneath, in combination with a piston between said projection and the wall of said cylinder and having packings at both ends, a pitman having a bearing in the head of said piston and a lubricating tube fixed in said head adapted to convey oil to said bearing and adapted to slide in the head of said cylinder.

2. In hot air engines, a power piston having one closed and one open end and packing rings about both ends, in combination with a cylinder having an open end and a receptacle about the inside of said end adapted to hold oil, a pitman extending through said open end and having a bearing on the head of said piston, and an oil duct through said head to said bearing.

3. In hot air engines, a power piston having a closed end and an open end respectively and packing rings about each end, in combination with a cylinder having an open end corresponding to the open end of said piston and a tubular projection in said end provided with a supporting flange engaged with the bottom edge of said cylinder and fluid tight therewith, and the said piston adapted to work between the wall of said cylinder and said tubular projection, and a piston rod extending through said tubular projection and engaged with the head of said piston.

In testimony whereof I affix my signature in presence of two witnesses.

FRANK B. HUBBARD.

Witnesses:
E. M. FISHER,
F. C. MUSSUN.